US010730545B2

(12) United States Patent
Kaneko et al.

(10) Patent No.: US 10,730,545 B2
(45) Date of Patent: Aug. 4, 2020

(54) STEERING APPARATUS

(71) Applicant: JTEKT CORPORATION, Osaka-shi, Osaka (JP)

(72) Inventors: Tetsuya Kaneko, Okazaki (JP); Masayoshi Asakura, Okazaki (JP); Satoshi Fujita, Okazaki (JP); Ryuji Shibata, Toyokawa (JP); Masashi Yamaguchi, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 456 days.

(21) Appl. No.: 15/539,067

(22) PCT Filed: Nov. 27, 2015

(86) PCT No.: PCT/JP2015/083303
§ 371 (c)(1),
(2) Date: Jun. 22, 2017

(87) PCT Pub. No.: WO2016/125368
PCT Pub. Date: Aug. 11, 2016

(65) Prior Publication Data
US 2017/0349205 A1    Dec. 7, 2017

(30) Foreign Application Priority Data

Feb. 3, 2015   (JP) ................................ 2015-019525

(51) Int. Cl.
*B62D 5/04* (2006.01)
*F16H 25/22* (2006.01)
(Continued)

(52) U.S. Cl.
CPC ......... *B62D 5/0403* (2013.01); *B62D 5/0424* (2013.01); *B62D 5/0448* (2013.01);
(Continued)

(58) Field of Classification Search
CPC .. B62D 5/0403; B62D 5/0424; B62D 5/0442; B62D 5/0445; B62D 5/0448; F16H 7/02;
(Continued)

(56) References Cited

U.S. PATENT DOCUMENTS 2,903,840 A * 9/1959 Teupel ............... B23Q 11/0816
57/1 R
5,437,349 A    8/1995 Kurahashi et al.
(Continued)

FOREIGN PATENT DOCUMENTS

DE  10 2009 000 575 A1   8/2010
JP       H06255503 A     9/1994
(Continued)

OTHER PUBLICATIONS

Oct. 2, 2018 Search Report issued in European Patent Application No. 15881185.1.
(Continued)

*Primary Examiner* — Jacob D Knutson
*Assistant Examiner* — Maurice L Williams
(74) *Attorney, Agent, or Firm* — Oliff PLC

(57) ABSTRACT

A rack housing and a reduction drive housing accommodate a ball screw mechanism and a reduction drive. Within the rack housing and the reduction drive housing, a gap is provided between the left end of a nut and the rack housing, and a gap is provided between the right end of the nut and the rack housing. A groove serving as a communication path in communication with the gaps on both axial sides of the nut is provided in the outer circumferential surface of the nut. The groove is provided so as to avoid a recirculation path provided in the nut. The groove is provided axially and rectilinearly from the end of the nut that is located on the side opposite to a flange, to the flange and is provided along the flange.

11 Claims, 10 Drawing Sheets

(51) Int. Cl.
*F16H 25/20* (2006.01)
*F16C 27/08* (2006.01)
*F16C 35/077* (2006.01)
*F16H 7/02* (2006.01)

(52) U.S. Cl.
CPC ............ *F16C 27/08* (2013.01); *F16C 35/077* (2013.01); *F16H 7/02* (2013.01); *F16H 25/22* (2013.01); *F16H 25/2214* (2013.01); *F16H 2025/2062* (2013.01)

(58) Field of Classification Search
CPC ................ F16H 25/2214; F16H 25/22; F16H 2025/2062; F16C 27/08; F16C 35/047; F16C 35/067; F16C 35/07; F16C 35/077
See application file for complete search history.

(56) References Cited

U.S. PATENT DOCUMENTS

| | | | |
|---|---|---|---|
| 2002/0063014 A1* | 5/2002 | Yoshida | B62D 5/0427 180/444 |
| 2003/0019686 A1* | 1/2003 | Fukuda | B62D 5/0427 180/444 |
| 2009/0294203 A1* | 12/2009 | Okada | B62D 5/0448 180/444 |
| 2012/0186896 A1* | 7/2012 | Yamamoto | B62D 5/0448 180/444 |
| 2013/0139628 A1 | 6/2013 | Yokoyama et al. | |
| 2013/0161114 A1* | 6/2013 | Bando | B62D 5/04 180/443 |
| 2013/0180794 A1* | 7/2013 | Shiino | B62D 5/04 180/444 |
| 2013/0247701 A1* | 9/2013 | Kiforiuk | B62D 5/0448 74/424.86 |
| 2014/0090921 A1* | 4/2014 | Shavrnoch | F16H 25/2204 180/444 |
| 2014/0155210 A1* | 6/2014 | Ichikawa | F16H 55/48 474/174 |
| 2014/0345966 A1* | 11/2014 | Asakura | B62D 5/0445 180/444 |
| 2016/0207560 A1* | 7/2016 | Muto | B62D 5/0403 |
| 2017/0114833 A1* | 4/2017 | Herbst | F16C 35/077 |

FOREIGN PATENT DOCUMENTS

| | | |
|---|---|---|
| JP | 2004-217046 A | 8/2004 |
| JP | 2006-224945 A | 8/2006 |
| JP | 2009-067166 A | 4/2009 |
| JP | 2014-227048 A | 12/2014 |
| JP | 2015-000594 A | 1/2015 |
| WO | 2012/017672 A1 | 2/2012 |
| WO | 2015/029672 A1 | 3/2015 |

OTHER PUBLICATIONS

Aug. 8, 2017 International Preliminary Report on Patentability issued in International Patent Application No. PCT/JP2015/083303.
Mar. 1, 2016 International Search Report issued in International Patent Application No. PCT/JP2015/083303.
Jul. 30, 2019 Office Action issued in Japanese Patent Application No. 2016-573189.

* cited by examiner

STEERING APPARATUS

TECHNICAL FIELD

The present invention relates to a steering apparatus.

BACKGROUND ART

An electric power steering (EPS) apparatus is known that applies power of an electric motor to a vehicle steering mechanism to assist steering performed by the driver. For example, Patent Document 1 describes an EPS apparatus including a rack shaft and an electric motor, which are parallel to each other. The EPS apparatus translates rotational motion of the electric motor to linear motion of the rack shaft using a ball screw mechanism to assist steering by the driver.

The EPS apparatus of Patent Document 1 drives the ball screw using a toothed belt attached to the rotary shaft of the electric motor. During linear motion of the rack shaft caused by steering by the driver, for example, one of the rack boots located on opposite ends of the rack shaft expands while the other contracts. Repetitive expansion and contraction of the rack boots may degrade the durability of the rack boots. For this reason, the housing accommodating the rack shaft includes a communication passage, which allows movement of air between the interior space in one of the rack boots and the interior space in the other. This limits expansion and contraction of the rack boots.

PRIOR ART DOCUMENT

Patent Document
Patent Document 1: German Patent Application Publication No. 102009000575

SUMMARY OF THE INVENTION

Problems that the Invention is to Solve

The EPS apparatus of Patent Document 1 may have a lower strength in the housing due to the communication passage formed in the housing.

It is an objective of the present invention to provide a steering apparatus that maintains the strength of the housing.

Means for Solving the Problems

To achieve the foregoing objective and in accordance with a first aspect of the present invention, a steering apparatus is provided that includes a turning shaft, a ball screw mechanism, a belt reduction drive, a housing, a boot, and a bearing. The turning shaft includes an axis and an outer circumferential surface, which has a helical thread groove, and reciprocates in an axial direction. The ball screw mechanism includes a cylindrical nut, which is screwed to the turning shaft through a plurality of balls. The nut includes an inner circumferential surface, which has a helical thread groove facing the thread groove of the turning shaft. The belt reduction drive includes a driving pulley, which rotates integrally with a rotary shaft of an electric motor, a driven pulley, which is fastened to an outer circumferential surface of the nut, and a belt, which is looped over the driving pulley and the driven pulley. The housing accommodates the turning shaft, the ball screw mechanism, and the belt reduction drive. The boot covers each end of the turning shaft and includes an end for connection to the housing and an end for connection to a tie rod. The bearing is located between an inner circumferential surface of the housing and the outer circumferential surface of the nut. The driven pulley and the nut constitute a pulley unit. The pulley unit includes a communication passage that provides communication between axially opposite sides of the pulley unit.

If the communication passage is formed in the housing, the thickness of the housing is reduced accordingly, lowering the strength of the housing. The structure described above includes the communication passage in the pulley unit, thereby maintaining the strength of the housing. That is, the strength of the housing is maintained by forming the communication passage in the pulley unit, which has an excess thickness. The communication passage formed in the nut of the pulley unit provides communication between the spaces on axially opposite sides of the pulley unit.

In the above-described steering apparatus, the nut includes a first end and a second end, which is opposite to the first end. The first end of the nut includes a flange. The communication passage includes a first groove that is located in the outer circumferential surface of the nut and extended from the second end to an intermediate position, a second groove that is located in an axial end surface of the flange and extended linearly in a radial direction of the flange, a third groove that is located in an outer circumferential surface of the flange and extended linearly in the axial direction so as to communicate with the second groove, and a fourth groove that is located in an inner circumferential surface of the driven pulley and extended in an axial direction of the driven pulley to correspond to a section of the nut that extends between the intermediate position and the second end. The fourth groove communicates with the first groove and the third groove.

Such a structure has the communication passage in the nut and the driven pulley, maintaining the strength of the housing.

In the above-described steering apparatus, the communication passage is a groove that extends in the outer circumferential surface of the nut over an entire axial length of the nut.

The nut has an excess thickness in the section that is free of the recirculation path. In addition, the strength of the nut can be maintained easily. Thus, the nut having the communication passage is still sufficiently strong.

The above-described steering apparatus preferably further includes a fastener that is screwed to the inner circumferential surface of the driven pulley. The outer circumferential surface of the nut includes a flange extending over an entire circumferential length. The driven pulley and the fastener sandwich the flange to fasten the nut to the driven pulley. The fastener has an inner diameter that is greater than an inner diameter of the nut so that a section of the communication passage located in an end surface of the flange is exposed to an interior space between the fastener and the turning shaft in the housing.

In such a structure, when the fastener fastens the nut to the driven pulley, the section of the communication passage located in the end surface of the flange is exposed to the interior space in the housing. The communication passage thus communicates with the interior space in the housing at the end of the nut.

In the above-described steering apparatus, the communication passage preferably includes a groove that extends in the outer circumferential surface of the nut from an axial end of the nut to an intermediate position, and a through-hole that radially extends through the driven pulley and communicates with the groove.

Such a structure includes the communication passage in the nut and the driven pulley, maintaining the strength of the housing.

In the above-described steering apparatus, the nut preferably includes a rotational position determination section that is used to confirm a position of the nut in a rotational direction. When the nut is viewed in a direction perpendicular to the axial direction, the communication passage and the rotational position determination section are collinear along an axis of the nut.

In such a structure, the communication passage is located in the pulley unit. This eliminates the need for redesigning the communication passage when the arrangement layout of the electric motor is changed. In addition, the rotational position determination section is collinear with the communication passage. This eliminates the need for positioning of the communication passage and the rotational position determination section in the circumferential direction of the nut.

In the above-described steering apparatus, the rotational position determination section preferably includes a rotational phase confirmation groove that is located in the outer circumferential surface of the nut to be used when the nut is coupled to the turning shaft, and a raceway surface machining reference groove that is located in an axial end surface of the nut to serve as a reference point when the thread groove is machined in the nut.

Such a structure includes the rotational phase confirmation groove and the raceway surface machining reference groove. This allows for more reliable coupling of the nut and machining of the thread groove.

In the above-described steering apparatus, the nut and the driven pulley preferably each include a pin hole extending in a radial direction. The pin holes of the nut and the driven pulley preferably communicate with each other and receive a pin.

In such a structure, the pin received in the pin holes of the nut and the driven pulley restricts independent rotation of the nut and the driven pulley. This fastens the nut to the driven pulley in a more reliable manner.

In the above-described steering apparatus, a section of the communication passage is preferably located in the driven pulley, and the nut preferably includes a pin hole extending in a radial direction. The pin hole of the nut receives a pin. The pin projects from the outer circumferential surface of the nut. A projecting section of the pin is received in a section of the communication passage located in the driven pulley such that the projecting section does not fully block the communication passage.

In such a structure, the projecting section of the pin that projects from the outer circumferential surface of the nut is received in the communication passage, thereby restricting independent rotation of the nut and the driven pulley. In addition, the pin in the communication passage does not fully block the communication passage so that the communication passage provides communication between axially opposite sides of the pulley unit.

In the above-described steering apparatus, the nut preferably includes a recirculation path for circulating the balls, and the pin hole and the recirculation path are preferably located on radially opposite sides of the nut.

In such a structure, the pin hole and the recirculation path are located on radially opposite sides of the nut so that the pin hole is spaced apart from the recirculation path. This allows the nut to maintain its strength.

The above-described steering apparatus preferably includes an elastic member that is located at each of axially opposite sides of the bearing, and two walls that are arranged in the axial direction on an inner circumferential surface of the housing. The bearing is movable in the axial direction relative to the housing and supported and sandwiched by the two walls with the elastic members located between the bearing and the walls.

The communication passage is formed in the nut and thus not close to the bearing. Consequently, when an elastic support structure is used for the bearing, any leakage of the lubricant applied between the bearing and the housing is unlikely to block the communication passage.

In the above-described steering apparatus, the bearing preferably includes an inner race and an outer race. A gap separates the inner race from the outer race, and a sealing member is located on an end of the bearing that faces toward the belt so as to fill the gap.

In such a structure, the sealing member limits entry of abrasion particles, which are scattered from the belt, into the bearing. If sealing members are located on two axial end surfaces of the bearing, the additional sealing member adds extra sliding resistance to the bearing as compared to a structure in which a sealing member is located on one of the axial ends. In the structure described above, the sealing member is located on one of the axial ends of the bearing so that the sliding resistance of the bearing does not increase.

Effects of the Invention

The steering apparatus of the present invention maintains the strength of the housing.

MODES FOR CARRYING OUT THE INVENTION

First Embodiment

A steering apparatus according to one embodiment will now be described.

Figure 1:
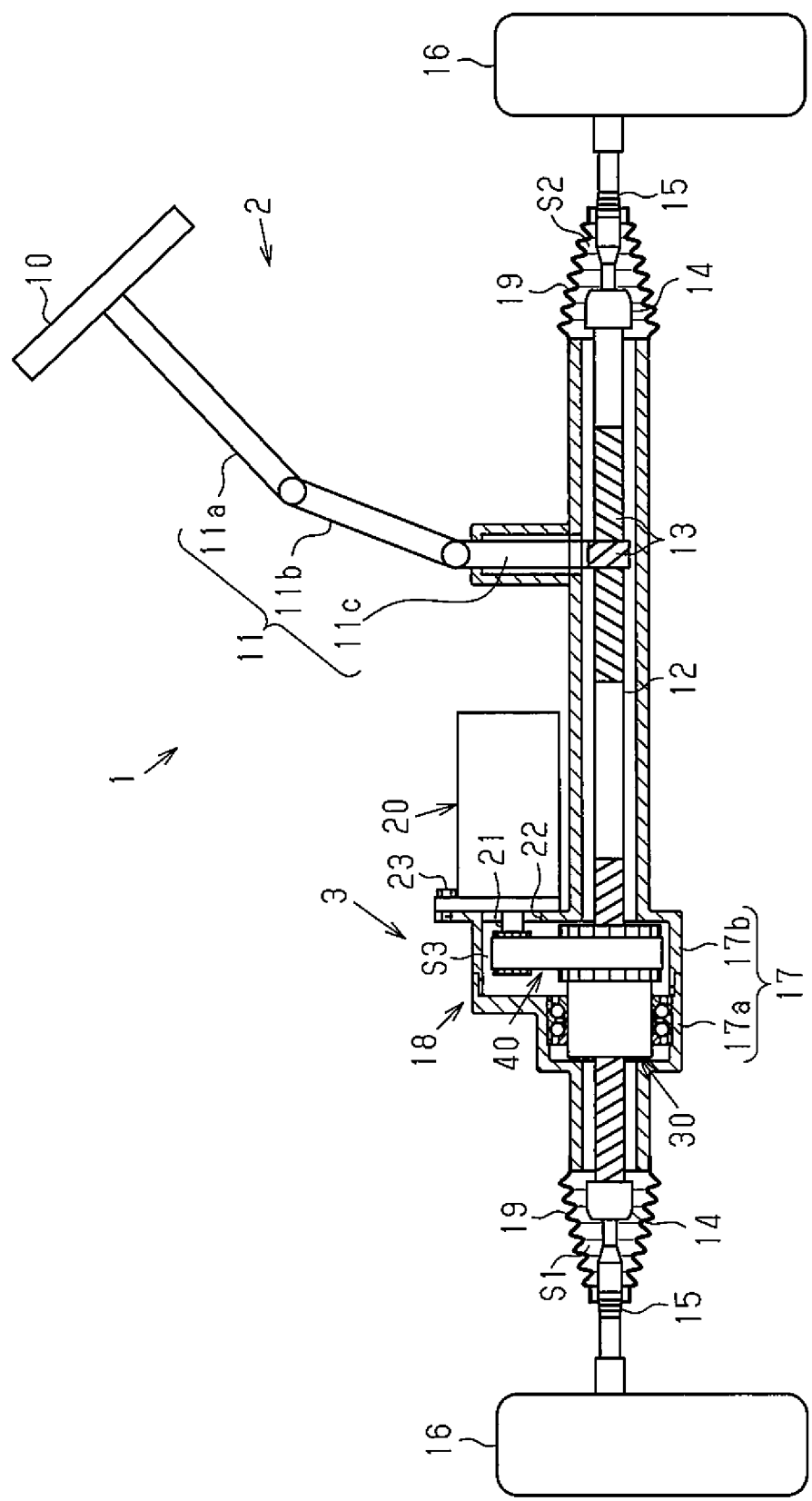
FIG. 1 is a diagram showing the structure of an electric power steering apparatus.

As shown in FIG. 1, an EPS apparatus 1 includes a steering mechanism 2, which steers turning wheels 16 in response to operation of a steering wheel 10 by the driver, and an assist mechanism 3, which assists steering by the driver.

The steering mechanism 2 includes the steering wheel 10 and a steering shaft 11, which rotates integrally with the steering wheel 10. The steering shaft 11 includes a column shaft 11a, which is coupled to the steering wheel 10, an intermediate shaft 11b, which is coupled to the lower end of the column shaft 11a, and a pinion shaft 11c, which is coupled to the lower end of the intermediate shaft 11b. The lower end of the pinion shaft 11c is coupled to a rack shaft 12, which serves as a turning shaft, through a rack-and-pinion mechanism 13. The rack-and-pinion mechanism 13, which includes the pinion shaft 11c and the rack shaft 12, translates rotational motion of the steering shaft 11 to linear motion of the rack shaft 12 in the axial direction (the sideward direction as viewed in FIG. 1). Rack ends 14 are coupled to opposite ends of the rack shaft 12. The rack ends 14 transmit linear motion of the rack shaft 12 to tie rods 15. Movement of the tie rods 15 is then transmitted to the right and left turning wheels 16. This changes the turning angle of the turning wheels 16.

A rack boot 19, which is a tubular bellows, is placed between each end of a rack housing 17 and the corresponding tie rod 15. Each rack boot 19 covers the corresponding rack end 14 and part of the corresponding tie rod 15. The rack boots 19 limit entry of foreign matter, such as dust or water, into the rack housing 17 and the rack ends 14. An interior space S1 in the left rack boot 19 communicates with an interior space S2 in the right rack boot 19 through the interior of the rack housing 17.

The assist mechanism 3 is coupled to the rack shaft 12. The assist mechanism 3 includes an electric motor 20, which is the source of assisting force, a ball screw mechanism 30, which is coupled to the circumference of the rack shaft 12, and a reduction drive 40, which transmits rotational force of a rotary shaft 21 of the electric motor 20 to the ball screw mechanism 30. The reduction drive 40 and the ball screw mechanism 30 of the assist mechanism 3 convert the rotational force of the rotary shaft 21 of the electric motor 20 into linear motion of the rack shaft 12 in the axial direction. The axial force applied to the rack shaft 12 acts as assisting force that assists steering by the driver.

The rack housing 17 covers the ball screw mechanism 30, the reduction drive 40, the pinion shaft 11c, and the rack shaft 12. The rack housing 17 is divided near the reduction drive 40 into a first housing 17a and a second housing 17b, which are arranged in the axial direction of the rack shaft 12 and coupled to each other. The rack housing 17 includes a reduction drive housing 18, which receives a part of the reduction drive 40. End sections of the coupled first and second housings 17a and 17b protrude in a direction intersecting the axis of the rack shaft 12 (upward as viewed in FIG. 1). The protruding end sections of the first and second housings 17a and 17b are butt-joined to form the reduction drive housing 18. The protruding section of the reduction drive housing 18 includes a right wall having a through-hole 22. The rotary shaft 21 of the electric motor 20 extends into the protruding section of the reduction drive housing 18 through the through-hole 22. The rotary shaft 21 is parallel to the rack shaft 12. A bolt 23 fastens the electric motor 20 to the right wall of the reduction drive housing 18. A narrow gap separates the rack shaft 12 from the rack housing 17.

Next, the assist mechanism 3 will be described.

Figure 2:
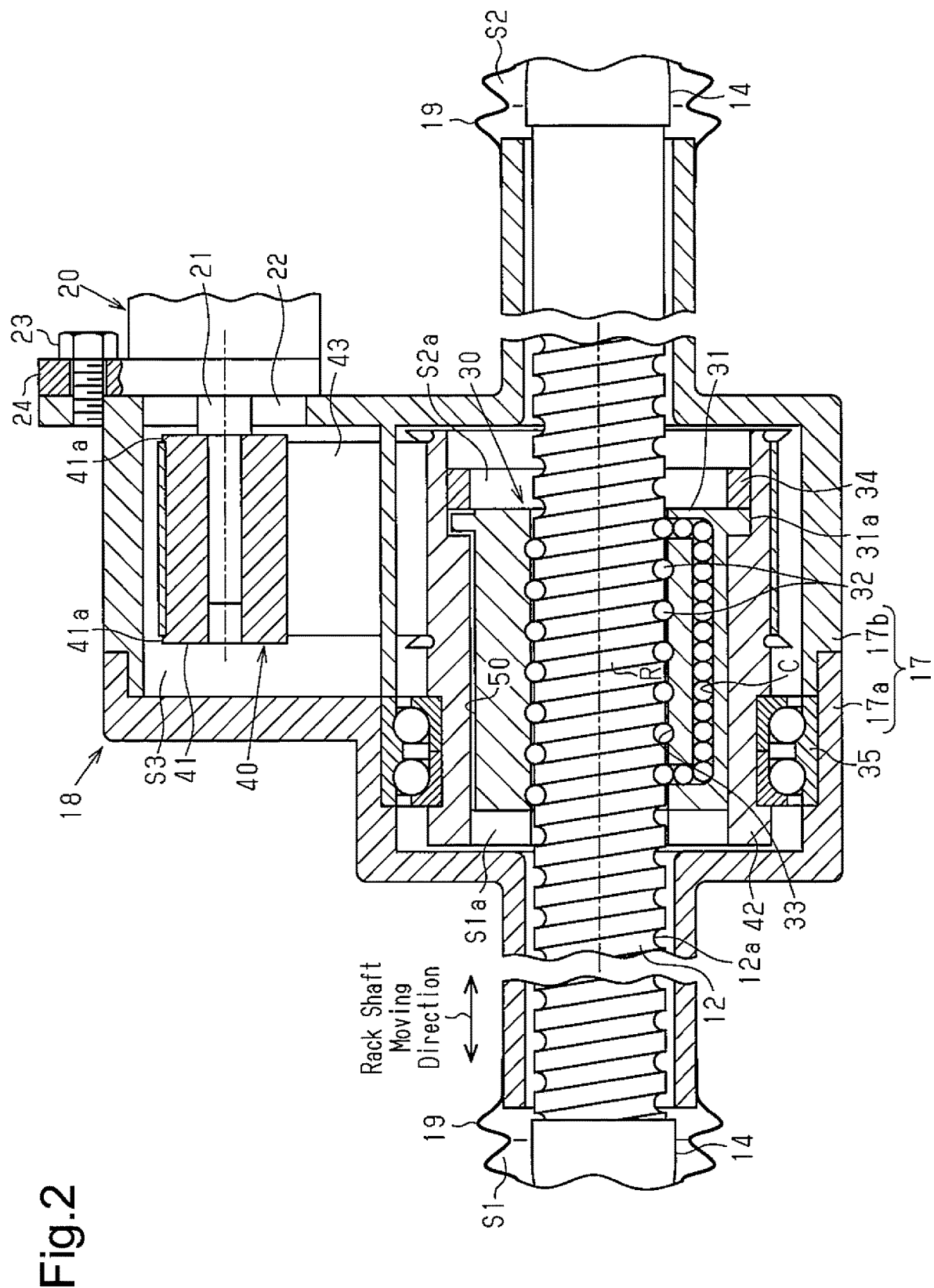
FIG. 2 is a partial cross-sectional view showing the general structure of an assist mechanism of an electric power steering apparatus of a first embodiment.

As shown in FIG. 2, the ball screw mechanism 30 includes a cylindrical nut 31, which is screwed to the rack shaft 12 through a plurality of balls 32, a cylindrical lock screw 34, which fastens the nut 31 to a driven pulley 42, and a bearing 35, which supports the nut 31 such that the nut 31 is rotational relative to the rack housing 17. The reduction drive 40 includes a driving pulley 41, which is coupled to the rotary shaft 21 of the electric motor 20, the driven pulley 42, which is coupled to the outer circumference of the nut 31, and a belt 43, which is looped over the driving pulley 41 and the driven pulley 42. The outer circumferential surface of the first end, which is the right end, of the nut 31 includes a flange 31a extending over the entire circumferential length. The outer circumferential surface of the lock screw 34 includes a thread groove, which is screwed to the thread groove of the driven pulley 42. The lock screw 34 moves in the axial direction so that the flange 31a is sandwiched between the lock screw 34 and the driven pulley 42, fastening the nut 31 to rotate integrally with the driven pulley 42. The belt 43 may be a toothed rubber belt (helically toothed belt) having a core. The driving pulley 41 and the driven pulley 42 have helical teeth. Axial ends of the driving pulley 41 each include a collar 41a, which limits dropping of the belt 43 from the driving pulley 41. The nut 31 and the driven pulley 42, which are fastened to each other to be integrally rotational, form a pulley unit.

The outer circumferential surface of the rack shaft 12 includes a helical thread groove 12a. The inner circumferential surface of the nut 31 includes a helical thread groove 33, which corresponds to the thread groove 12a. The cylindrical bearing 35 supports the nut 31 such that the nut 31 is rotational relative to the inner circumferential surface of the rack housing 17. The bearing 35 may be a double row angular contact ball bearing. The helical clearance defined by the thread groove 33 of the nut 31 and the thread groove 12a of the rack shaft 12 functions as a raceway R through which the balls 32 roll. The nut 31 includes a recirculation path C, which connects two openings of the raceway R. The recirculation path C in the nut 31 allows the balls 32 to circulate in the raceway R endlessly. The recirculation path C may be an end deflector type recirculation path.

In the assist mechanism 3, when the rotary shaft 21 of the electric motor 20 rotates, the driving pulley 41 rotates together with the rotary shaft 21. The belt 43 transmits the rotation of the driving pulley 41 to the driven pulley 42 so that the driven pulley 42 rotates together with the nut 31. The nut 31 rotates relative to the rack shaft 12. The plurality of balls 32, which is located between the nut 31 and the rack shaft 12, receives load from both of the nut 31 and the rack shaft 12 and endlessly circulates in the raceway R. The endless circulation of the balls 32 in the raceway R converts the torque of the electric motor 20 applied to the nut 31 into axial force of the rack shaft 12. This moves the rack shaft 12 in the axial direction relative to the nut 31. The axial force applied to the rack shaft 12 acts as assisting force that assists steering by the driver.

Inside the rack housing 17 and the reduction drive housing 18, which accommodate the ball screw mechanism 30 and the reduction drive 40, a gap S1a separates the left end of the nut 31 from the rack housing 17, and a gap S2a separates the right end of the nut 31 from the rack housing 17. The outer circumferential surface of the nut 31 includes a groove 50, which provides communication between the gaps S1a and S2a on axially opposite sides of the nut 31. The groove 50 functions as a communication passage. The groove 50 is separated from the recirculation path C in the nut 31. The groove 50 extends linearly in the axial direction of the nut 31 from the left end of the nut 31, which is opposite to the flange 31a, to the flange 31a. The groove 50 then extends in the shape a crank along the flange 31a of the nut 31. The groove 50 provides communication between the gaps S1a and S2a on axially opposite sides of the nut 31 and thus provides communication between the interior space S1 in the left rack boot 19 and the interior space S2 in the right rack boot 19. The nut 31 and the driven pulley 42 each include a circumferential section where the nut 31 and the driven pulley 42 are out of contact with each other over the entire axial length.

The operation of the groove 50 is now described along with the air movement path between the interior spaces S1 and S2.

The interior space S1 communicates with a gap between the rack shaft 12 and the rack housing 17. This gap communicates with the gap S1a. The gap S1a communicates with the gap S2a through the groove 50. The gap S2a communicates with a gap between the rack shaft 12 and the rack housing 17. This gap communicates with the interior space S2. The interior space S1 thus communicates with the interior space S2 through the groove 50.

When such a path provides communication between the interior spaces S1 and S2 in the rack boots 19, leftward movement of the rack shaft 12 expands the bellows of the left rack boot 19, thereby expanding the interior space S1. At the same time, the interior space S2 starts to contract, causing the air in the interior space S1 to move to the interior space S2 through the groove 50. Ideally, axial movement of the rack shaft 12 does not change the pressure in the interior spaces S1 and S2. Even in a less ideal situation, the pressure in the interior spaces S1 and S2 does not change significantly since air starts to move through the groove 50 immediately after the interior space S1 starts to expand and the interior space S2 starts to contract at the same time.

Driving of the belt 43 produces abrasion particles in the reduction drive housing 18. Abrasion particles are particularly produced near the driving pulley 41. The engagement between the belt 43 and the helical teeth of the driving pulley 41 may move the belt 43 relative to the driving pulley 41 in the axial direction of the rack shaft 12. This may bring the belt 43 into contact with a collar 41a, producing abrasion particles. Movement of air between the interior spaces S1 and S2 through the rack housing 17 and movement of air in the reduction drive housing 18 due to driving of the belt 43 tend to scatter abrasion particles in the reduction drive housing 18.

In this respect, the first embodiment includes the groove 50 in the nut 31 and thus eliminates the need for an air path near the driving pulley 41. This reduces the possibility of air flowing near the driving pulley 41, where more abrasion particles may be present.

Forming the groove 50 in the nut 31 has the following advantages.

The groove 50 can be formed in the inner circumferential surface of the rack housing 17, for example. In such a structure, forming the groove 50 in the rack housing 17 reduces the thickness of the rack housing 17 accordingly. This may reduce the strength of the rack housing 17. In contrast, the first embodiment has the groove 50 in the nut 31 so that the strength of the rack housing 17 is maintained.

The recirculation path C occupies only a part of the nut 31. That is, the section of the nut 31 that is free of the recirculation path C has a sufficient thickness. The section of the nut 31 that is free of the recirculation path C does not have to be thick. The nut 31 is made of a metal or a similar material and thus inherently strong.

Accordingly, the nut 31 including a thinner section still has a sufficient strength. In addition, the groove 50 in the nut 31 reduces the weight of the nut 31.

The first embodiment achieves the following advantages.

(1) Forming the groove 50 in the nut 31 allows the rack housing 17 to maintain its strength.

(2) Forming the groove 50 in the nut 31 provides communication between the interior spaces S1 and S2. This eliminates the need for providing an air path near the driving pulley 41. This reduces the possibility of air flowing near the driving pulley 41, where more abrasion particles may be present, limiting scattering of abrasion particles caused by air flow. The absence of the groove 50 near the bearing 35 limits entry of abrasion particles into the bearing 35.

(3) When the belt 43 is a toothed rubber belt having a core, driving of the belt 43 may produce abrasion particles. Depending on the vehicle layout, such abrasion particles may collect and accumulate on some part of the rack housing 17. If the electric motor 20 and the communication passage are located under the rack shaft 12, abrasion particles are likely to collect and accumulate under the rack shaft 12. In this case, movement of air through the communication passage may cause abrasion particles to enter and block the communication passage. In this respect, the first embodiment rotates the nut 31, thereby limiting constant entry of abrasion particles into the communication passage. That is, the groove 50, which rotates together with the nut 31, resists entry of abrasion particles into the groove 50.

Second Embodiment

A steering apparatus according to a second embodiment will now be described. Differences from the first embodiment will mainly be discussed.

Figure 3:
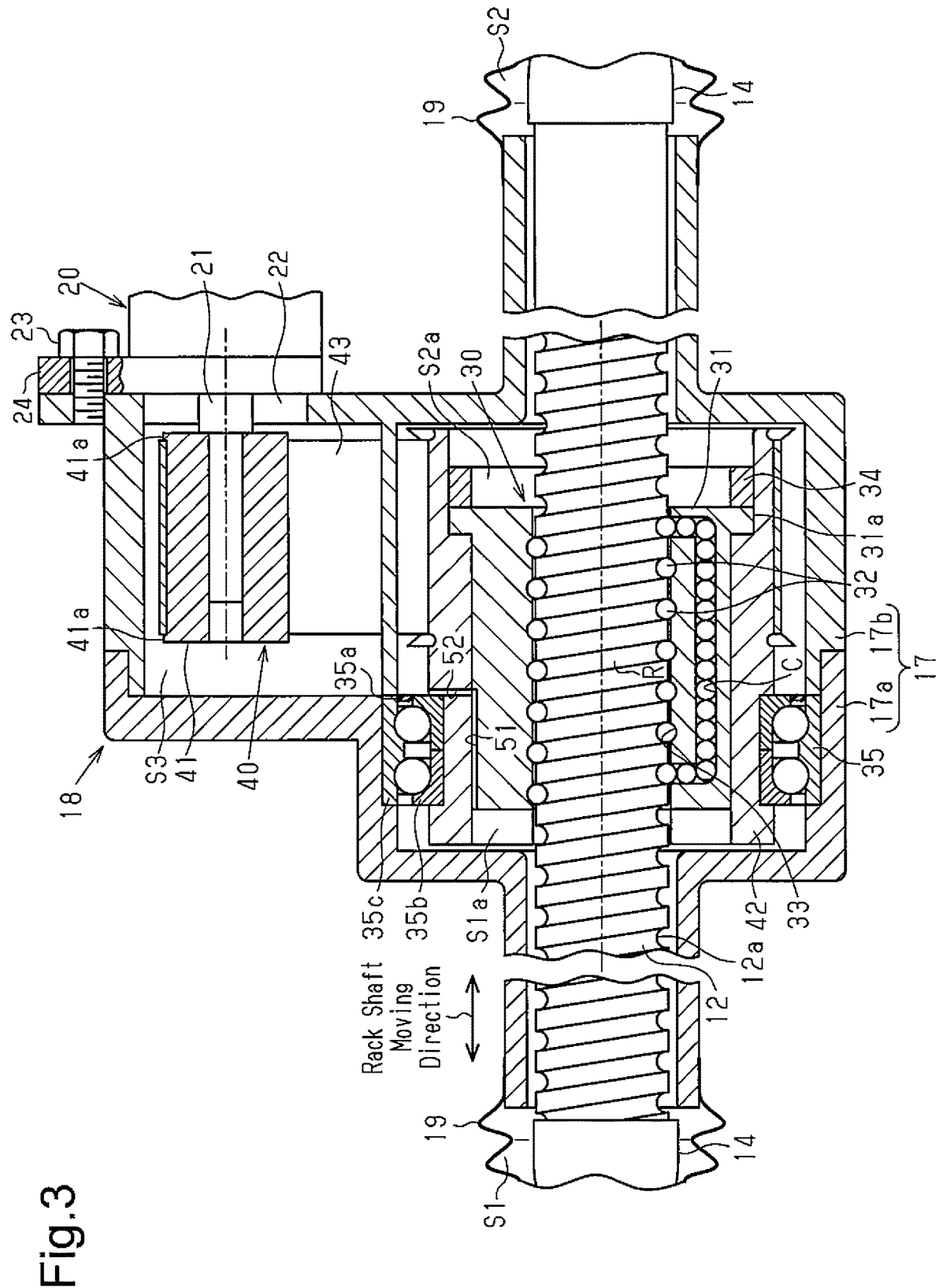
FIG. 3 is a partial cross-sectional view showing the general structure of an assist mechanism of an electric power steering apparatus of a second embodiment.

FIG. 3 shows a groove 51 that, unlike the groove 50 of the first embodiment, extends from the left end of the nut 31, which is opposite to the flange 31a, to an intermediate position. Specifically, the groove 51 extends from the left end of the nut 31 to a position that is slightly beyond the right end of the bearing 35.

The driven pulley 42 includes a through-hole 52 extending in the radial direction through the driven pulley 42. The through-hole 52 is aligned with the intermediate position of the nut 31. The lower end of the through-hole 52 is connected to the first end, which is the right end, of the groove 51. The groove 51 and the through-hole 52 function as a communication passage. The second end, which is the upper end, of the through-hole 52 is connected to an interior space S3 in the reduction drive housing 18, which accommodates the belt 43 and the driving pulley 41. The gap S1a thus communicates with the interior space S3 through the groove 51 and the through-hole 52. The interior space S3 communicates with the gap S2a through a gap between the rack housing 17 and the nut 31 and a gap between the rack housing 17 and the driven pulley 42, which extend in the axial direction.

A sealing member 35a is located on the right end of the bearing 35. That is, the sealing member 35a is located on the end of the bearing 35 near the belt 43. The sealing member 35a fills the gap between an inner race 35b and an outer race 35c of the bearing 35.

Next, the operation of the groove 51 and the through-hole 52 will be described.

The interior space S1 communicates with a gap between the rack shaft 12 and the rack housing 17. This gap communicates with the gap S1a. The gap S1a communicates with the interior space S3 through the groove 51 and the through-hole 52. The interior space S3 communicates with the gap S2a through a gap between the rack housing 17 and the nut 31 and a gap between the rack housing 17 and the driven pulley 42, which extend in the axial direction. The gap S2a communicates with a gap between the rack shaft 12 and the rack housing 17. This gap communicates with the interior space S2. The interior space S1 thus communicates with the interior space S2 through the groove 51 and the through-hole 52.

The upper end of the through-hole 52 is connected to the interior space S3. Consequently, movement of air between the interior spaces S1 and S2 may scatter abrasion particles produced by the belt 43. However, the sealing member 35a located on the end of the bearing 35 near the belt 43 limits entry of such abrasion particles into the bearing 35.

A sealing member 35a can be placed on each of the two axial ends of the bearing 35. However, such a structure increases the sliding resistance of the bearing 35 when the nut 31 rotates relative to the rack housing 17. In contrast, placing a sealing member 35a only on one of the two ends of the bearing 35 reduces the sliding resistance of the bearing 35 as compared to a structure including sealing members 35a on both ends of the bearing 35. Of the two ends of the bearing 35, the sealing member 35a is located on the end that is closer to the belt 43 and where foreign matter such as abrasion particles tends to enter the bearing 35. This effectively limits entry of foreign matter into the bearing 35.

The second embodiment achieves the following advantages in addition to advantages similar to those of the first embodiment.

(1) Placing the sealing member 35a only on one of the two axial ends of the bearing 35 reduces the sliding resistance of the bearing 35 when the nut 31 rotates relative to the rack housing 17. The sealing member 35a limits entry of foreign matter such as abrasion particles into the bearing 35 without increasing the sliding resistance of the bearing 35.

(2) The driven pulley 42 and the lock screw 34 sandwich the flange 31a to fasten the nut 31 to the driven pulley 42. The second embodiment does not include the groove 50 in the flange 31a. Unlike the structure in which the groove 50 is formed in the flange 31a, the area of the contact surface between the driven pulley 42 and the flange 31a and the area of the contact surface (seating surface) between the lock screw 34 and the flange 31a are not reduced. This allows for sufficient contact areas between the driven pulley 42 and the flange 31a and between the lock screw 34 and the flange 31a, fastening the nut 31 to the driven pulley 42 in a more reliable manner.

Third Embodiment

A steering apparatus according to a third embodiment will now be described. Differences from the second embodiment will mainly be discussed.

Figure 4:
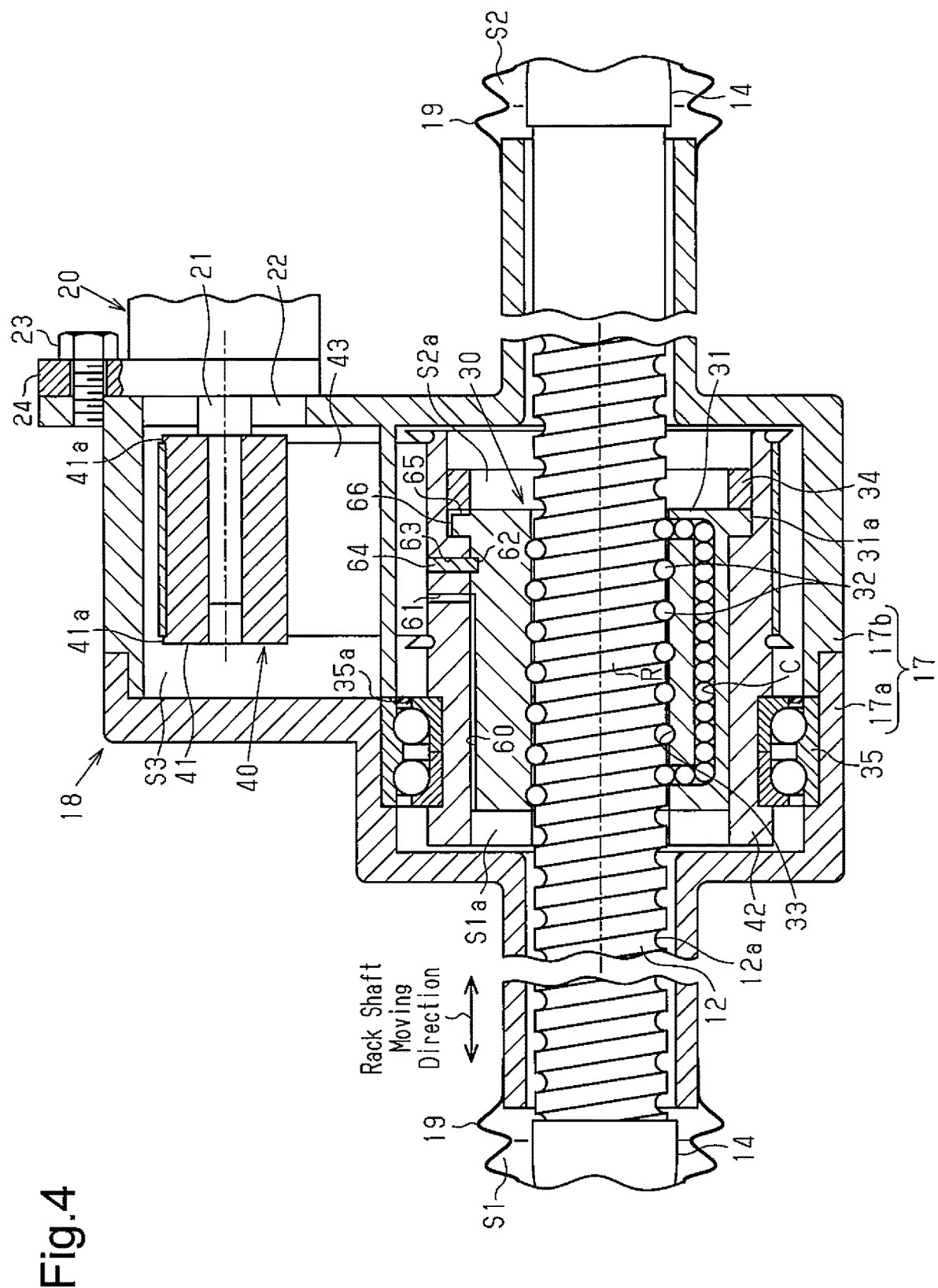
FIG. 4 is a partial cross-sectional view showing the general structure of an assist mechanism of an electric power steering apparatus of a third embodiment.

As shown in FIG. 4, to provide communication between the gap S1a on the left side of the nut 31 and the gap S2a on the right side of the nut 31, the outer circumferential surface of the nut 31 includes a groove 60, and the driven pulley 42 includes a through-hole 61 extending in the radial direction through the driven pulley 42. The groove 60 extends from the left end of the nut 31, which is opposite to the flange 31a, to an intermediate position. Specifically, the groove 60 extends from the left end of the nut 31 to a position at a distance from the right end of the nut 31. The groove 60 is longer than the groove 51 shown in FIG. 3. The lower end of the through-hole 61 is connected to the first end, which is the right end, of the groove 60.

The nut 31 includes a pin hole 62 located between the groove 60 and the flange 31a. The driven pulley 42 includes a pin hole 63 extending in the radial direction through the driven pulley 42. The pin holes 62 and 63 are aligned with each other and receive a pin 64. The pin 64 is fitted into the pin holes 62 and 63 and fastened to the nut 31 and the driven pulley 42. This restricts relative rotation between the nut 31 and the driven pulley 42.

The nut 31 will now be described.

Figure 5A:
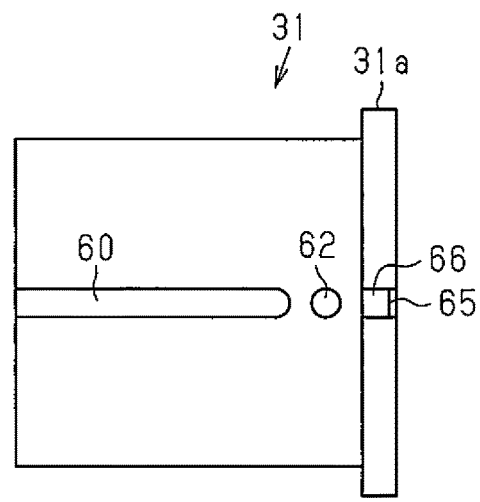
FIG. 5A is a top view showing a nut of the electric power steering apparatus of the third embodiment.
Figure 5B:
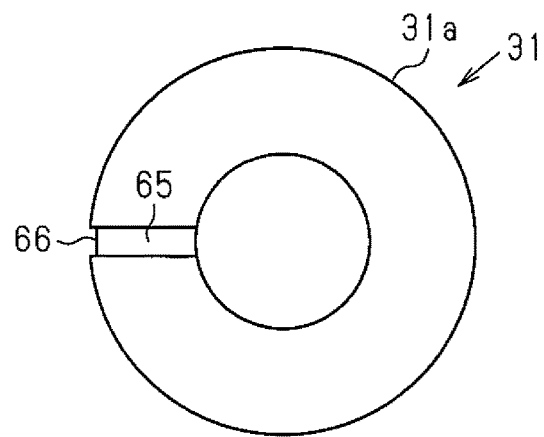
FIG. 5B is an end view of the nut.

As shown in FIG. 5A, the outer circumferential surface of the nut 31 includes the groove 60. The groove 60 extends linearly from the left end of the nut 31, which is opposite to the flange 31a, to the intermediate position. The pin hole 62 is collinear with the groove 60 in the outer circumferential surface of the nut 31. The flange 31a includes a groove 65, which serves as a reference point in machining of the raceway surface of the ball screw, and a groove 66 for rotational phase confirmation. The groove 66 is formed in the circumferential surface of the flange 31a. When the nut 31 is viewed in a direction perpendicular to the axial direction, the groove 66 is collinear with the groove 60. The groove 66 extends linearly over the entire axial length of the flange 31a. The groove 65 is formed in an axial end surface of the nut 31. As shown in FIG. 5B, when the flange 31a is viewed in the axial direction of the nut 31, the groove 65 extends linearly in the radial direction of the flange 31a. The groove 65 connects the inner circumferential surface of the nut 31 to the outer circumferential surface of the flange 31a. When the nut 31 is viewed in a direction perpendicular to the axial direction of the nut 31, the groove 60, the pin hole 62, and the grooves 65 and 66 are collinear.

The groove 65 serves as a reference point when the thread groove 33 is formed in the inner circumferential surface of the nut 31 using a machine tool (not shown). The machine tool extends into the nut 31 when forming the thread groove 33. If the groove 65 is located in the inner circumferential surface of the nut 31, the circumferential position of the groove 65 in the nut 31 cannot be checked. Any rotation of the nut 31 during formation of the thread groove 33 hinders formation of the helical thread groove 33 as specified. For this reason, a jig (not shown) is required to fix the outer circumferential surface of the nut 31 to limit rotation and axial movement of the nut 31 during formation of the thread groove 33. For this reason, the groove 65 is formed in an axial end surface of the nut 31, instead of the inner or outer circumferential surface of the nut 31. The thread groove 33 is formed using the groove 65 as the reference point, which is not hidden by the machine tool or the jig.

The groove 66 is used when the nut 31 is coupled to the rack shaft 12. The nut 31 is screwed to the rack shaft 12 through the balls 32, but the balls 32 cannot be placed on the raceway R unless the helix of the thread groove 33 is aligned with the helix of the thread groove 12a. Thus, the phase of helix of the thread groove 33 and the phase of helix of the thread groove 12a need to be matched when the nut 31 is coupled to the rack shaft 12. To assemble the ball screw, the rack shaft 12 and the balls 32 are placed on the inner circumferential surface of the nut 31. Thus, forming the groove 66 in the inner circumferential surface of the nut 31 is not desirable since the groove 66 cannot be seen. For this reason, the groove 66 is formed in the outer circumferential surface of the flange 31a of the nut 31. The phases of helix of the thread grooves 33 and 12a are matched referring to the groove 66.

Advantages of forming the groove 60 in the nut 31 and the through-hole 61 in the driven pulley 42 are now described. First, a comparison example is described in which the groove 60 is formed in the rack housing 17.

The groove 60, which functions as the communication passage, can be formed in the inner circumferential surface of the rack housing 17, for example. In this case, the groove 60 would be designed with consideration given to the arrangement layout of the electric motor 20 and an MCU (not shown), which controls the electric motor 20. The MCU may be integral with the electric motor 20. The belt 43 tends to produce abrasion particles near the driving pulley 41 coupled to the rotary shaft 21 of the electric motor 20. Thus, as viewed in the axial direction of the rack shaft 12, the groove 60 should be placed in a position in the rack housing 17 that is spaced apart from the electric motor 20. Consequently, any change in the position of the electric motor 20 may require rearrangement of the groove 60 in the rack housing 17.

In this regard, the third embodiment includes the groove 60 in the nut 31 and the through-hole 61 in the driven pulley 42. That is, the communication passage is formed in the pulley unit. As a result, any change in the arrangement layout of the electric motor 20 does not involve rearrangement of the groove 60 or the through-hole 61. This is because the circumferential position of the groove 60 in the nut 31 is essentially irrelevant to the effect of abrasion particles that are produced near the driving pulley 41.

When the EPS apparatus 1 assists steering by the driver, the groove 60 and the through-hole 61 rotate together with the nut 31 and the driven pulley 42. If the groove 60 is formed in the rack housing 17 for example, the position of the groove 60 is fixed relative to the electric motor 20. In contrast, when the groove 60 is formed in the nut 31, rotation of the nut 31 changes the position of the groove 60 relative to the electric motor 20. Thus, the position of the groove 60 in the nut 31 will not significantly worsen the effect of abrasion particles. This allows for a high flexibility in positioning the groove 60 in the nut 31. Once the groove 60 is designed, the initial design may be used even if the arrangement layout of the electric motor 20 is changed, eliminating the need for new design. As with the groove 60, the through-hole 61 does not require redesigning.

The third embodiment achieves the following advantages in addition to advantages similar to those of the first embodiment.

(1) Forming the groove 60 in the nut 31 and the through-hole 61 in the driven pulley 42 substantially eliminates the need for redesigning the groove 60 when the arrangement of the electric motor 20 or the shape of the rack housing 17 is changed. Further, a steering apparatus usable in both a right-hand drive car and a left-hand drive car may be designed without redesigning the groove 60. The first and second embodiments, which include the communication passage in the pulley unit, also achieve the same advantage.

(2) If the groove 60, the pin hole 62, the groove 65, which serves as the reference point in machining of the raceway surface of the ball screw, and the groove 66 for rotational phase confirmation are not collinear, the nut 31 requires positioning in the circumferential direction, as well as in the axial direction. In the third embodiment, the groove 60, the pin hole 62, the groove 65, and the groove 66 are collinear in the nut 31. This simplifies the process of forming the grooves 60, 65 and 66 and the pin hole 62. The grooves 60, 65 and 66 and the pin hole 62 do not require positioning in the circumferential direction. The machine tool simply moves in the axial direction of the nut 31 to form the groove 60, the pin hole 62, the groove 66, and the groove 65 in this order in sequential operation, reducing the number of process steps. In addition, such a structure reduces the sections of the nut 31 to be machined.

(3) The pin 64 in the pin holes 62 and 63 restricts relative rotation and axial movement between the nut 31 and the driven pulley 42. This fastens the nut 31 to the driven pulley 42 in a more reliable manner.

Fourth Embodiment

A steering apparatus according to a fourth embodiment will now be described. Differences from the first embodiment will mainly be discussed.

Figure 6:
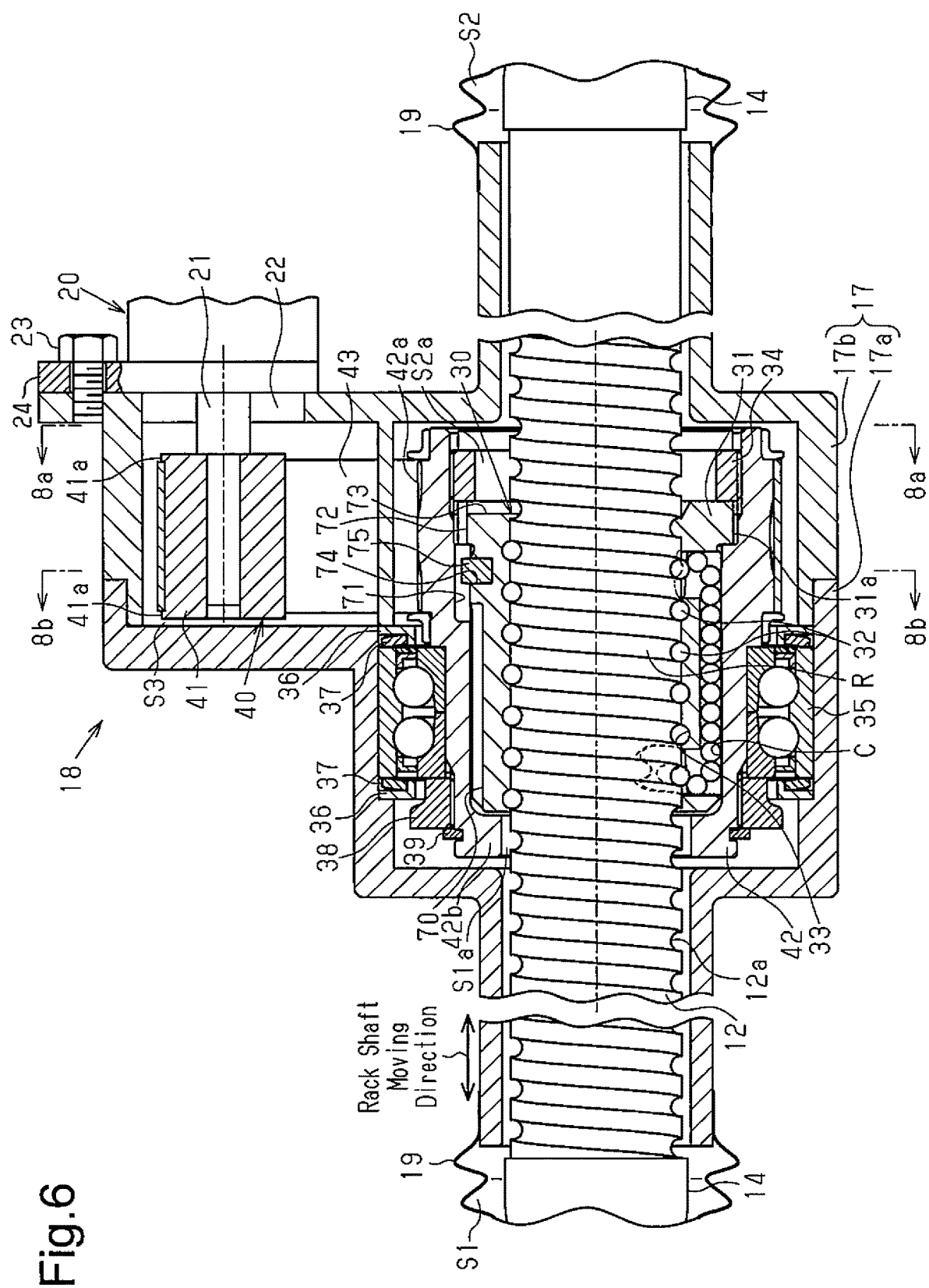
FIG. 6 is a partial cross-sectional view showing the general structure of an assist mechanism of an electric power steering apparatus of a fourth embodiment.

As shown in FIG. 6, the nut 31 includes a groove 70 that extends from the left end of the nut 31, which is opposite to the flange 31a, to an intermediate position. Specifically, the groove 70 extends from the left end of the nut 31 to a position that is slightly beyond the right end of the bearing 35.

The inner circumferential surface of the driven pulley 42 includes a groove 71. The groove 71 extends from the first end, which is the right end, of the driven pulley 42 to an intermediate position, which is aligned with the groove 70 in the radial direction. The groove 70 communicates with the groove 71. The groove 71 is substantially as deep as the inner circumferential surface of the section of the driven pulley 42 that receives the flange 31a. The outer circumferential surface of the driven pulley 42 includes a flange 42a, which extends from the first end and covers a certain area. The outer circumferential surface of the flange 42a has helical teeth, which meshes with the belt 43. The groove 71 is formed in the inner circumferential surface of the flange 42a. The flange 31a is on the inner side of in the flange 42a. In this position, the groove 71 extends from a section of the driven pulley 42 that faces the flange 31a. The groove 71 extends a certain length toward the second end, which is the left end, of the driven pulley 42. The outer circumferential surface of the flange 31a has grooves 72 and 73. The groove 72 extends over the entire length of the flange 31a in the axial direction of the nut 31. The depth of the groove 72 is set such that the bottom surface of the groove 72 is substantially flush with the outer circumferential surface of the section of the nut 31 that is free of the flange 31a. The groove 72 communicates with the groove 71. The groove 73 is formed in the right end of the flange 31a, which is the first end of the nut 31, and extended linearly in the radial direction of the flange 31a. The groove 73 connects the inner circumferential surface of the nut 31 to the outer circumferential surface of the flange 31a. The nut 31 includes a pin hole 74 located between the groove 70 and the flange 31a. The pin hole 74 extends inward from the outer circumferential surface of the nut 31 but does not extend through the nut 31.

Figure 7A:
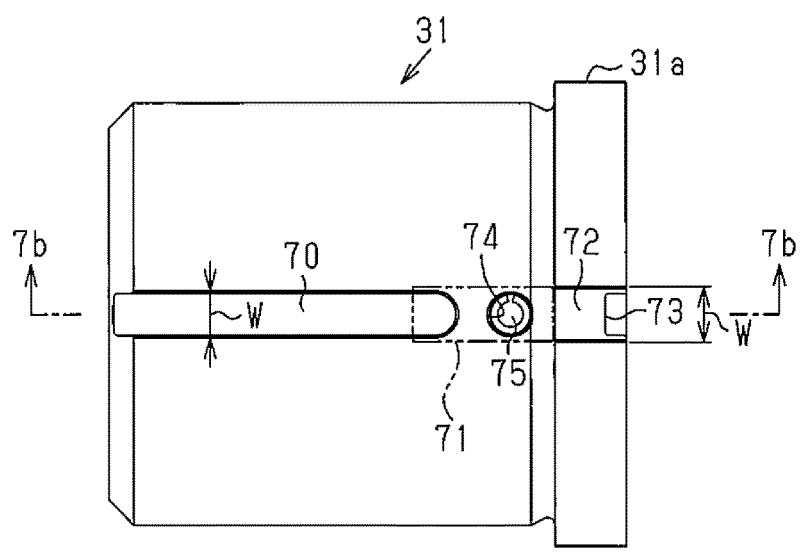
FIG. 7A is a top view showing a nut of the electric power steering apparatus of the fourth embodiment.

As shown in FIG. 7A, when the nut 31 is viewed in a direction perpendicular to the axial direction of the nut 31, the groove 70, the pin hole 74, and the grooves 72 and 73 are collinear. The diameter of the pin hole 74 is substantially equal to the width W of the groove 70. The width W of the groove 70 is measured in a direction perpendicular to the axial direction of the nut 31. The pin hole 74 receives a pin 75. The pin 75 has a diameter that is slightly smaller than the width W of the groove 71. The width W of the groove 71 is measured in a direction perpendicular to the axial direction of the driven pulley 42. When viewed in a radial direction perpendicular to the axial direction, the groove 71 is collinear with the groove 70, the pin hole 74, and the grooves 72 and 73.

Figure 7B:
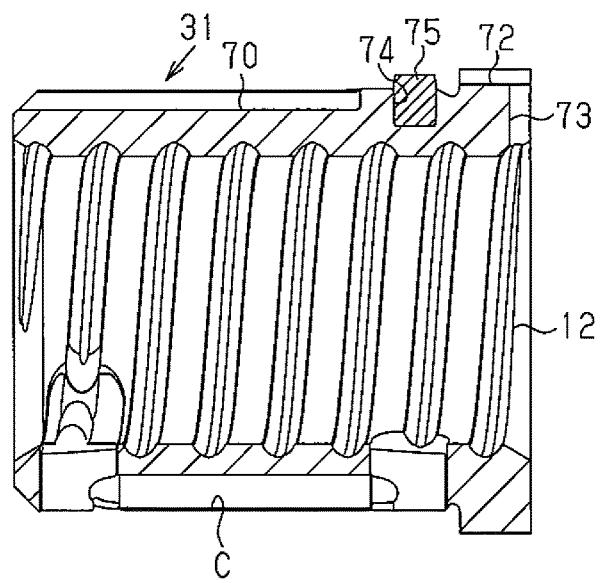
FIG. 7B is a cross-sectional view taken along line 7b-7b in FIG. 7A, showing the nut in engagement with a rack shaft.

As shown in FIG. 7B, the pin hole 74 and the recirculation path C are located on radially opposite sides of the nut 31. The pin hole 74 is separated from the recirculation path C. It is desirable that the pin hole 74 be far from the recirculation path C. If the pin hole 74 is located near the recirculation path C, the strength of the section of the nut 31 including the recirculation path C and the pin hole 74 locally decreases. In contrast, the pin hole 74 that is located radially opposite to the recirculation path C in the nut 31, that is, located in a position farthest from the recirculation path C when the nut 31 is viewed in the axial direction, is far from the recirculation path C. This limits local decrease in the strength of the nut 31.

Figure 7C:
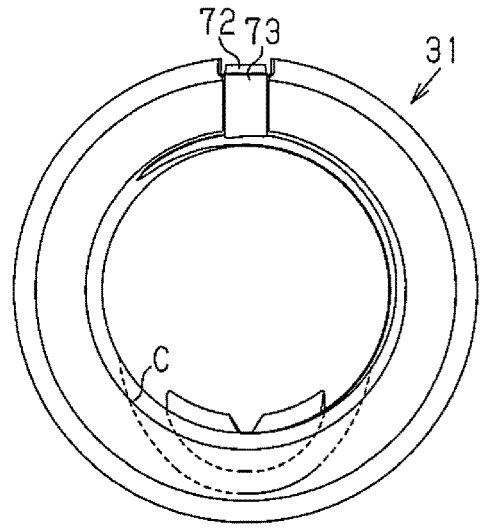
FIG. 7C is an end view of the nut.

As shown in FIG. 7C, the grooves 72 and 73 are also located radially opposite to the recirculation path C in the nut 31. As with the pin hole 74, such a structure limits local decrease in the strength of the nut 31. As shown in FIG. 7A, the groove 70, which is collinear with the grooves 72 and 73, is also located opposite to the recirculation path C. This also helps the nut 31 to maintain its strength.

As shown in FIG. 7B, the pin 75, when fully inserted to the bottom of the pin hole 74, projects out of the outer circumferential surface of the section of the nut 31 that is free of the groove 70 or 72. That is, the pin 75 has a greater axial dimension than the pin hole 74. The projection length of the pin 75 is set such that the distal end of the pin 75 is located radially inward of the outer circumference of the flange 31a.

Figure 8A:
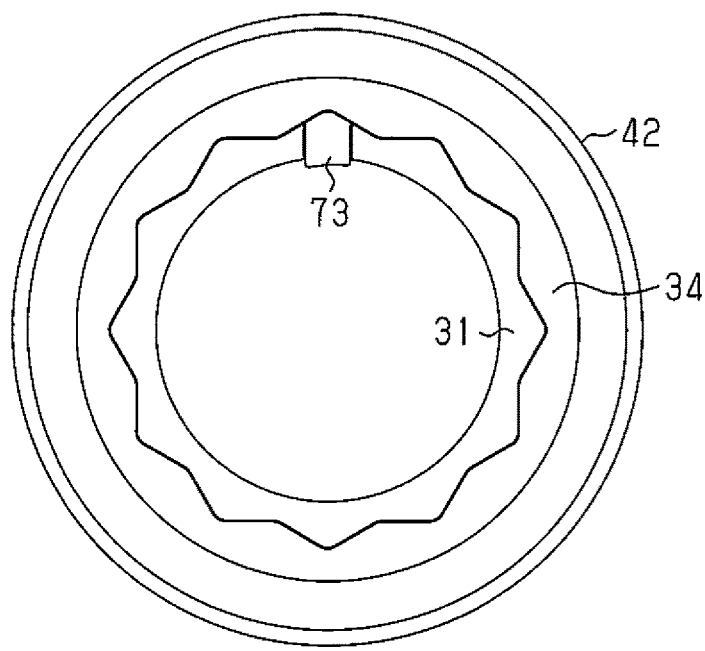
FIG. 8A is a cross-sectional view taken along line 8a-8a in FIG. 6, showing a driven pulley to which the nut and a lock screw are coupled.
Figure 8B:
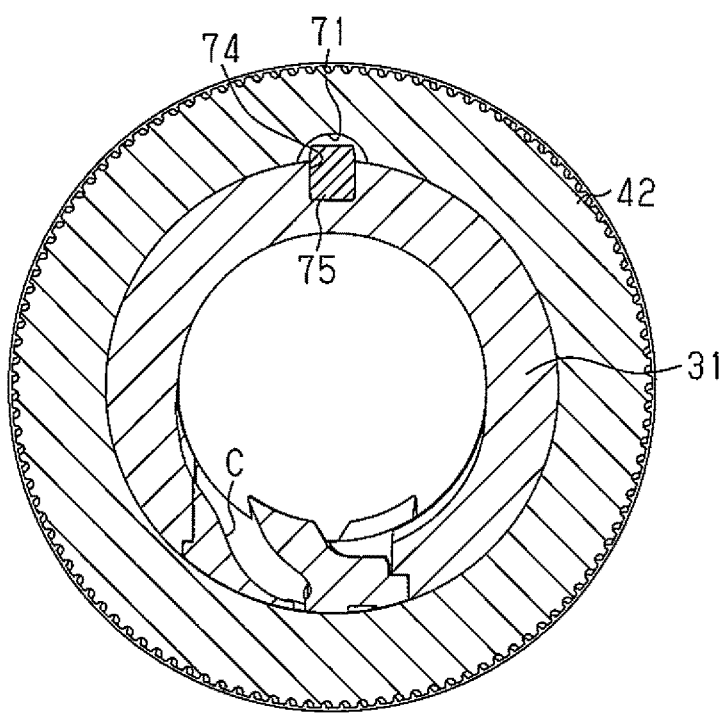
FIG. 8B is a cross-sectional view taken along line 8b-8b in FIG. 6, showing the driven pulley to which the nut and the lock screw are coupled.

As shown in FIG. 8B, a narrow gap separates the groove 71 from the pin 75. When the nut 31 rotates about its axis relative to the driven pulley 42, the pin 75 comes into contact with the groove 71, restricting rotation of the nut 31 relative to the driven pulley 42.

As shown in FIG. 8A, the lock screw 34, which is screwed to the driven pulley 42, has an outer diameter that is substantially equal to the inner diameter of the driven pulley 42. The inner circumferential surface of the lock screw 34 includes recesses and protrusion, which alternate in the circumferential direction. The inner diameters of the lock screw 34, which are the distance between protrusions and the distance between the recesses in the radial direction, are greater than the inner diameter of the nut 31. When the lock screw 34 is viewed in the axial direction, the groove 73 is aligned with one of the recesses of the lock screw 34. That is, the groove 73 is aligned with a position of the lock screw 34 where the difference between the inner diameter of the lock screw 34 and the inner diameter of the nut 31 is greatest. The groove 73 is exposed to the gap S2a in the axial direction of the nut 31 and thus communicates with the gap S2a.

As shown in FIG. 6, the second end of the driven pulley 42 includes a reduced diameter section 42b protruding radially inward. The reduced diameter section 42b has an inner diameter that is smaller than the outer diameter of the section of the nut 31 that is free of the groove 70 or 72. The inner diameter of the reduced diameter section 42b is greater than the outer diameter of the rack shaft 12. A gap separates the reduced diameter section 42b from the nut 31, and the gap S1a separates the reduced diameter section 42b from the rack shaft 12.

The grooves 70, 71, 72 and 73 function as a communication passage between the interior spaces S1 and S2. The communication between the interior space S1 and the gap S1a and the communication between the interior space S2 and the gap S2a are the same as those in the first embodiment. The gap S1a communicates with the groove 70 through the gap between the nut 31 and the reduced diameter section 42b. The groove 70 communicates with the gap S2a through the grooves 71, 72 and 73. The communication between the interior spaces S1 and S2 moves air between the interior spaces S1 and S2.

As shown in FIG. 6, the rack housing 17 includes an elastic support structure, which supports the bearing 35 to be movable in the axial direction. The elastic support structure includes plates 36 located at axially opposite sides of the bearing 35 and disc springs 37 each located between the corresponding plate 36 and the bearing 35. The disc springs 37 serve as elastic members. The contact between the plates 36 and sections of the rack housing 17 restricts axial movement of the plates 36. Each plate 36 has an L-shaped cross-section. Each disc spring 37 is sandwiched between the corresponding plate 36 and the outer race of the bearing 35. The inner race of the bearing 35 is sandwiched between an end surface of the flange 42a of the driven pulley 42 and an annular fastening member 38. The inner diameter of the fastening member 38 is slightly larger than the outer diameter of the section of the driven pulley 42 that is free of the flange 42a. The outer circumferential surface of the section of the driven pulley 42 that is free of the flange 42a has a thread groove, which extends a certain length from the second end of the driven pulley 42 toward the first end. The inner circumferential surface of the fastening member 38 includes a thread groove that is screwed to the thread groove of the driven pulley 42. The engagement between the thread groove of the driven pulley 42 and the thread groove of the fastening member 38 couples the fastening member 38 to the driven pulley 42. The outer diameter of the section of the fastening member 38 that is in contact with the bearing 35 is slightly smaller than the outer diameter of the inner race of the bearing 35. The outer diameter of the section of the fastening member 38 that is in contact with the bearing 35 is smaller than the inner diameter of the outer race of the bearing 35. The outer diameter of the section of the fastening member 38 that is in contact with the bearing 35 is smaller than the inner diameters of the plates 36 and the disc springs 37. The fastening member 38 is attached to the second end of the driven pulley 42 and moved toward the first end of the driven pulley 42. After the flange 42a and the fastening member 38 sandwich the bearing 35, a retention ring 39 is fitted to the driven pulley 42. This fastens the fastening member 38 to the driven pulley 42 and limits axial movement of the fastening member 38 relative to the driven pulley 42. The bearing 35 is thus supported to be movable relative to the rack housing 17 in the axial direction.

To facilitate axial movement of the bearing 35, lubricant oil is applied to the contact surface between the bearing 35 and the rack housing 17 in the elastic support structure. Since the communication passage (the grooves 70 to 72) does not extend near the bearing 35, any leakage of the lubricant from the contact surface is unlikely to block the communication passage.

The fourth embodiment achieves the advantages described below. The communication passage of the fourth embodiment, which is formed by the grooves 70 to 73, has the same advantages as the first embodiment. The fourth embodiment also achieves an advantage similar to the advantage (1) of the third embodiment.

(1) The pin 75 in the pin hole 74 restricts relative rotation between the nut 31 and the driven pulley 42. This fastens the nut 31 to the driven pulley 42 in a more reliable manner. A narrow gap separates the groove 71 from the pin 75, allowing the groove 71 to function as a part of the communication passage, as well as to receive the pin 75.

The above-described embodiments may be modified as follows. The following modifications can be combined as long as the combined modifications remain technically consistent with each other.

In the embodiments described above, the bearing 35 is a double row angular contact ball bearing. However, the bearing 35 may be a four-point contact ball bearing or a single row angular contact ball bearing.

In the embodiments described above, the belt 43 may be a V-belt instead of a toothed belt.

In the embodiments described above, a fastener other than the lock screw 34 may be used to fasten the nut 31 to the driven pulley 42.

In the first embodiment, the outer circumferential surface of the nut 31 includes the groove 50. Instead, a hole extending through the nut 31 in the axial direction may function as the communication passage.

In the first and third embodiments, the grooves 50 and 60 may be formed in the driven pulley 42 instead of the outer circumferential surface of the nut 31. That is, the grooves 50 and 60 may be located in either component of the pulley unit.

In the second embodiment, the nut 31 includes the groove 51, and the driven pulley 42 includes the through-hole 52. However, the groove 51 may be formed in the driven pulley 42 and extended from the left end to an intermediate position of the driven pulley 42. The through-hole 52 may communicate with the groove 51 at the intermediate position of the driven pulley 42.

In the third embodiment, the nut 31 includes the groove 60, and the driven pulley 42 includes the through-hole 61. However, the groove 60 may be formed in the driven pulley 42 and extended from the left end to an intermediate position of the driven pulley 42. The through-hole 61 may communicate with the groove 60 at the intermediate position of the driven pulley 42.

In the first embodiment, the groove 50 extends in the shape of a crank along the flange 31a of the nut 31. However, the groove 50 may be a linear cutout section extending in the axial direction of the nut 31. In this case, the groove 50 extends axially through the flange 31a. This facilitates manufacturing of the nut 31.

In a similar manner as the third embodiment, the flange 31a of other embodiments described above may include the groove 65 that serves as a reference point in machining of the raceway surface of the ball screw and the groove 66 for rotational phase confirmation. In this case, the existing grooves that function as the communication passage preferably serve the functions of the grooves 65 and 66.

Figure 5C:
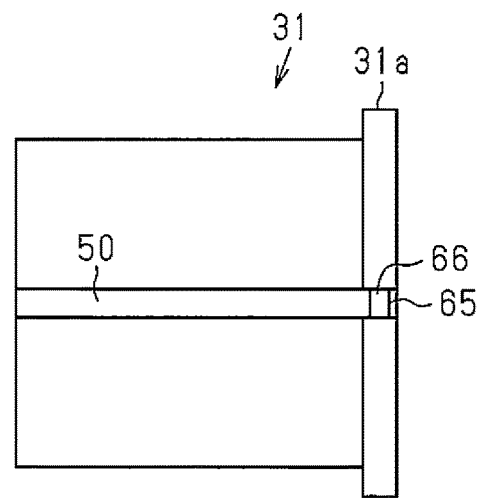
FIG. 5C is a top view of a nut of an electric power steering apparatus of another embodiment.

For example, the groove 50 of the first embodiment may serve the function of the grooves 65 and 66. As shown in FIGS. 2 and 5C, unlike the groove 60 of the third embodiment, the groove 50 of the first embodiment extends over the entire axial length of the nut 31. The groove 50 includes a first section that extends linearly in the axial direction between the left end of the nut 31, which is opposite to the flange 31a, and the right end of the flange 31a, and a second section that is continuous with the first section and extended in the shape of a crank along the flange 31a. The second section of the groove 50 extends along the end surface of the nut 31 beside the lock screw 34 to a position inward of the inner circumferential surface of the lock screw 34. Accordingly, the groove 50 provides communication between the gaps S1a and S2a on axially opposite sides of the nut 31, and thus provides communication between the interior spaces S1 and S2.

The groove 50 in the flange 31a functions as the groove 65 that serves as a reference point in machining of the raceway surface of the ball screw and the groove 66 for rotational phase confirmation. That is, the section of the groove 50 in the flange 31a that is located in the end surface of the nut 31 functions as the groove 65, and the section extending in the circumference of the nut 31 functions as the groove 66.

In the fourth embodiment, it is preferable that the pin hole 74 be far from the recirculation path C in the radial direction of the nut 31. However, the pin hole 74 may be shifted toward the recirculation path C in the circumferential direction of the nut 31. That is, the pin hole 74 may be located in any position as long as it is separated from the recirculation path C. In addition, the grooves 70, 72 and 73 may be located in any positions as long as they are separated from the recirculation path C.

The pin holes 62 and 63 and the pin 64 may be omitted in the third embodiment. Such a structure still provides communication between the interior spaces S1 and S2 through the path of the third embodiment. The pin hole 74 and the pin 75 may be omitted in the fourth embodiment. Such a structure still provides communication between the interior spaces S1 and S2 through the path of the fourth embodiment.

The first and second embodiments may include pin holes and a pin that limit relative rotation between the nut 31 and the driven pulley 42. In this case, the pin holes and the pin may restrict relative rotation and axial movement between the nut 31 and the driven pulley 42 in the same manner as the third embodiment, or restrict relative rotation between the nut 31 and the driven pulley 42 in the same manner as the fourth embodiment.

In the second embodiment, sealing members 35a may be located on axially opposite sides of the bearing 35. Such a structure increases the sliding resistance of the bearing 35 but limits entry of abrasion particles into the bearing 35 in a more reliable manner. In the embodiments other than the second embodiment, the sealing member 35a may be located on one or both of the axially opposite sides of the bearing 35.

Figure 9:
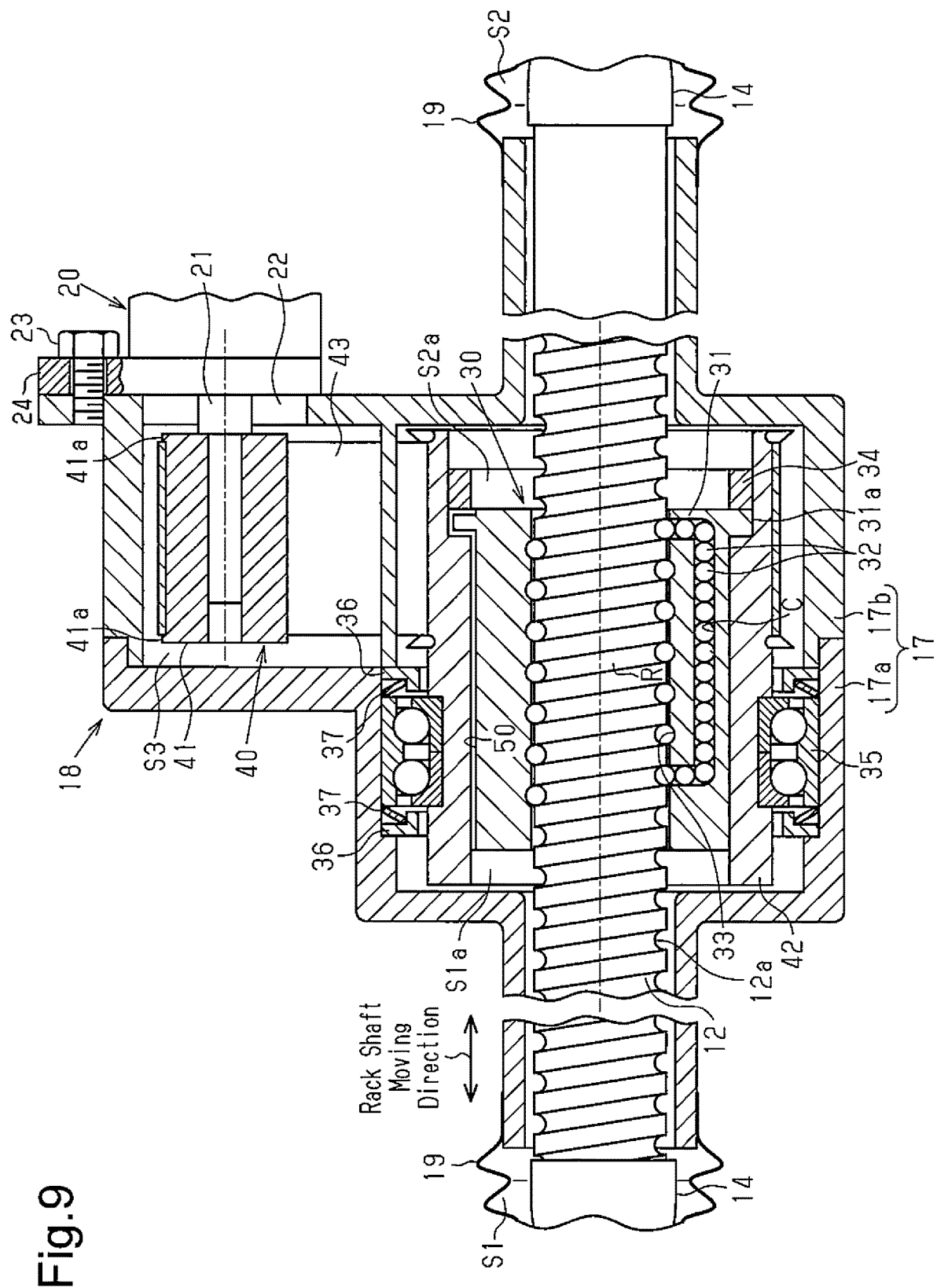
FIG. 9 is a partial cross-sectional view showing the general structure of an assist mechanism of an electric power steering apparatus of another embodiment.
Figure 10:
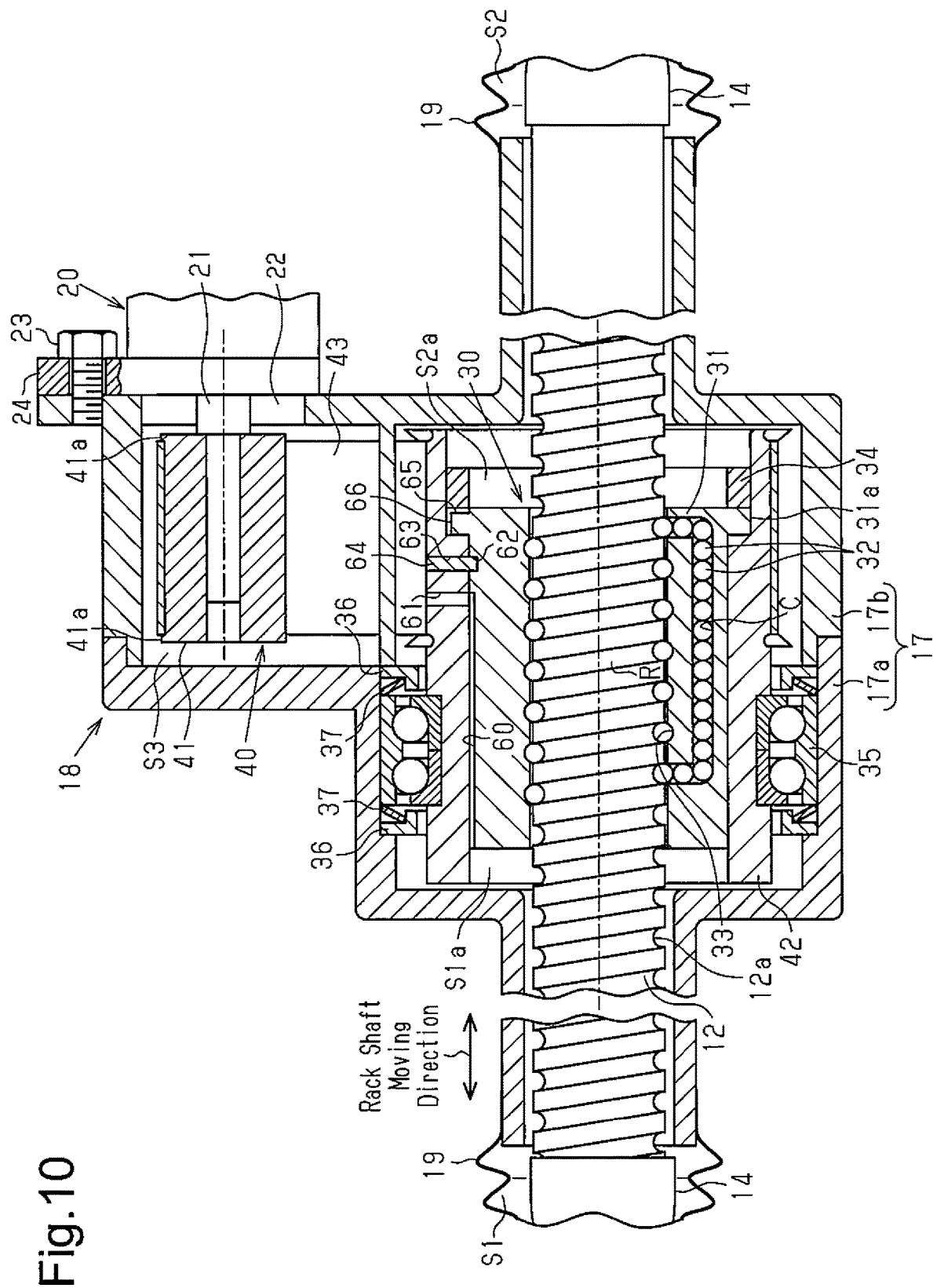
FIG. 10 is a partial cross-sectional view showing the general structure of an assist mechanism of an electric power steering apparatus of yet another embodiment.

In the first to third embodiments, the bearing 35 is fixed to the rack housing 17. However, an elastic support structure (floating structure) may be used, which does not fix the bearing 35 to the rack housing 17. As shown in FIGS. 9 and 10, the first embodiment may include an elastic support structure by placing annular plates 36 at axially opposite sides of the bearing 35 and placing disc springs 37 between the plates 36 and the bearing 35. The bearing 35 supported by the elastic support structure is movable in the axial direction. To facilitate axial movement of the bearing 35, lubricant oil may be applied to the contact surface between the bearing 35 and the rack housing 17. In the first embodiment, since the groove 50 does not extend near the bearing 35, any leakage of the lubricant from the contact surface is unlikely to block the groove 50.

In addition to the EPS apparatus 1, the present invention may be embodied as a steering apparatus including a reduction drive 40 that uses a belt 43. Further, the present invention may be used for a steer-by-wire (SBW) apparatus, in addition to the electric power steering apparatus that assists linear motion of the rack shaft 12, which is caused in response to steering operation, using rotational force of the electric motor 20. When used for a steer-by-wire apparatus, the present invention may be embodied as a rear wheel steering apparatus or a 4-wheel steering apparatus (4WS), in addition to a front wheel steering apparatus. When used for an SBW apparatus, a shaft that does not have a rack may be used as the turning shaft, instead of the rack shaft 12 having a rack. In this case, a ball screw mechanism may be used to apply steering force to the turning shaft.

DESCRIPTION OF THE REFERENCE NUMERALS

1: EPS apparatus, 2: steering mechanism, 3: assist mechanism, 10: steering wheel, 11: steering shaft, 11a: column shaft, 11b: intermediate shaft, 11c: pinion shaft, 12: rack shaft (turning shaft), 12a: thread groove, 13: rack-and-pinion mechanism, 14: rack end, 15: tie rod, 16: turning wheel, 17: rack housing (housing), 17a: first housing, 17b: second housing, 18: reduction drive housing, 19: rack boot (boot), 20: electric motor, 21: rotary shaft, 22: through-hole, 23: bolt 30: ball screw mechanism, 31: nut (pulley unit), 31a: flange, 32: ball, 33: thread groove, 34: lock screw (fastener), 35: bearing, 35a: sealing member, 35b: inner race, 35c: outer race, R: raceway, 36: plate, 37: disc spring, 38 and 39: retention ring, 40: reduction drive (belt reduction drive), 41: driving pulley, 41a: collar, 42: driven pulley (pulley unit), 42a: flange, 42b: reduced diameter section, 43: belt, 50 and 51: groove (communication passage), 52: through-hole (communication passage), 60: groove (communication passage), 61: through-hole (communication passage), 62 and 63: pin hole, 64: pin, 65: ball screw raceway surface machining reference groove (rotational position determination section), 66: rotational phase confirmation groove (rotational position determination section), 70: groove (communication passage, first groove), 71: groove (communication passage, fourth groove), 72: groove (communication passage, third groove), 73: groove (communication passage, second groove), 74: pin hole, 75: pin, S1, S2 and S3: interior space, S1a and S2a: gap, R: raceway, W: width

The invention claimed is:
1. A steering apparatus comprising:
a turning shaft that (i) includes an axis and an outer circumferential surface having a helical thread groove and (ii) is configured to reciprocate in an axial direction;
a ball screw mechanism that includes a cylindrical nut that is screwed to the turning shaft through a plurality of balls, wherein the nut includes an inner circumferential surface that has a helical thread groove facing the helical thread groove of the turning shaft;
a belt reduction drive including (i) a driving pulley that rotates integrally with a rotary shaft of an electric motor, (ii) a driven pulley that is fastened to an outer circumferential surface of the nut, and (iii) a belt that is looped over the driving pulley and the driven pulley;
a housing that accommodates the turning shaft, the ball screw mechanism, and the belt reduction drive;
boots respectively covering ends of the turning shaft, each of the boots including an end for connection to the housing and an end for connection to a tie rod; and a bearing located between an inner circumferential surface of the housing and the outer circumferential surface of the nut, wherein
the driven pulley and the nut constitute a pulley unit,
the pulley unit includes a communication passage that provides communication between axially opposite sides of the pulley unit,
the nut includes a first end and a second end, which is opposite to the first end,
the first end of the nut includes a flange, and
the communication passage includes
a first groove that is located in the outer circumferential surface of the nut and extends from the second end to an intermediate position,
a second groove that is located in an axial end surface of the flange and extends linearly in a radial direction of the flange,
a third groove that is located in an outer circumferential surface of the flange and extends linearly in the axial direction so as to communicate with the second groove, and
a fourth groove that is located in an inner circumferential surface of the driven pulley and extends in an axial direction of the driven pulley to correspond to a section of the nut that extends between the intermediate position and the second end, wherein the fourth groove communicates with the first groove and the third groove.

2. The steering apparatus according to claim 1, wherein the communication passage is a groove that extends in the outer circumferential surface of the nut over an entire axial length of the nut.

3. The steering apparatus according to claim 1, further comprising a fastener that is screwed to the inner circumferential surface of the driven pulley, wherein
the outer circumferential surface of the nut includes the flange extending over an entire circumferential length,
the driven pulley and the fastener sandwich the flange to fasten the nut to the driven pulley, and
the fastener has an inner diameter that is greater than an inner diameter of the nut so that a section of the communication passage located in an end surface of the flange is exposed to an interior space between the fastener and the turning shaft in the housing.

4. The steering apparatus according to claim 1, wherein the nut includes a rotational position determination section that is used to confirm a position of the nut in a rotational direction, and
when the nut is viewed in a direction perpendicular to the axial direction, the communication passage and the rotational position determination section are collinear along an axis of the nut.

5. The steering apparatus according to claim 4, wherein the rotational position determination section includes
a rotational phase confirmation groove that is located in the outer circumferential surface of the nut to be used when the nut is coupled to the turning shaft, and
a raceway surface machining reference groove that is located in an axial end surface of the nut to serve as a reference point when the thread groove is machined in the nut.

6. The steering apparatus according to claim 1, wherein the nut and the driven pulley each include a pin hole extending in a radial direction, and
the pin holes of the nut and the driven pulley communicate with each other and receive a pin.

7. The steering apparatus according to claim 6, wherein
the nut includes a recirculation path for circulating the balls, and
the pin hole and the recirculation path are located on radially opposite sides of the nut.

8. The steering apparatus according to claim 1, further comprising:
elastic members respectively located at axially opposite sides of the bearing; and
two walls that are arranged in the axial direction on an inner circumferential surface of the housing,
wherein the bearing is movable in the axial direction relative to the housing and supported and sandwiched by the two walls with the elastic members located between the bearing and the walls.

9. The steering apparatus according to claim 1, wherein
the bearing includes an inner race and an outer race,
a gap separates the inner race from the outer race, and
a sealing member is located on an end of the bearing that faces toward the belt so as to fill the gap.

10. A steering apparatus comprising:
a turning shaft that (i) includes an axis and an outer circumferential surface having a helical thread groove and (ii) is configured to reciprocate in an axial direction;
a ball screw mechanism that includes a cylindrical nut that is screwed to the turning shaft through a plurality of balls, wherein the nut includes an inner circumferential surface that has a helical thread groove facing the helical thread groove of the turning shaft;
a belt reduction drive including (i) a driving pulley that rotates integrally with a rotary shaft of an electric motor, (ii) a driven pulley that is fastened to an outer circumferential surface of the nut, and (iii) a belt that is looped over the driving pulley and the driven pulley;
a housing that accommodates the turning shaft, the ball screw mechanism, and the belt reduction drive;
boots respectively covering ends of the turning shaft, each of the boots including an end for connection to the housing and an end for connection to a tie rod; and
a bearing located between an inner circumferential surface of the housing and the outer circumferential surface of the nut, wherein
the driven pulley and the nut constitute a pulley unit,
the pulley unit includes a communication passage that provides communication between axially opposite sides of the pulley unit, and
the communication passage includes
a groove that extends in the outer circumferential surface of the nut from an axial end of the nut to an intermediate position, and
a through-hole that radially extends through the driven pulley and communicates with the groove.

11. A steering apparatus comprising:
a turning shaft that (i) includes an axis and an outer circumferential surface having a helical thread groove and (ii) is configured to reciprocate in an axial direction;
a ball screw mechanism that includes a cylindrical nut that is screwed to the turning shaft through a plurality of balls, wherein the nut includes an inner circumferential surface that has a helical thread groove facing the helical thread groove of the turning shaft;
a belt reduction drive including (i) a driving pulley that rotates integrally with a rotary shaft of an electric motor, (ii) a driven pulley that is fastened to an outer circumferential surface of the nut, and (iii) a belt that is looped over the driving pulley and the driven pulley;
a housing that accommodates the turning shaft, the ball screw mechanism, and the belt reduction drive;
boots respectively covering ends of the turning shaft, each of the boots including an end for connection to the housing and an end for connection to a tie rod; and
a bearing located between an inner circumferential surface of the housing and the outer circumferential surface of the nut, wherein
the driven pulley and the nut constitute a pulley unit,
the pulley unit includes a communication passage that provides communication between axially opposite sides of the pulley unit,
a section of the communication passage is located in the driven pulley,
the nut includes a pin hole extending in a radial direction,
the pin hole of the nut receives a pin,
the pin projects from the outer circumferential surface of the nut, and
a projecting section of the pin is received in a section of the communication passage located in the driven pulley such that the projecting section does not fully block the communication passage.

* * * * *

UNITED STATES PATENT AND TRADEMARK OFFICE
CERTIFICATE OF CORRECTION

PATENT NO. : 10,730,545 B2
APPLICATION NO. : 15/539067
DATED : August 4, 2020
INVENTOR(S) : Tetsuya Kaneko et al.

Page 1 of 1

It is certified that error appears in the above-identified patent and that said Letters Patent is hereby corrected as shown below:

On the Title Page

(30) Foreign Application Priority Data should read:
Feb. 3, 2015 (JP) ........................... 2015-019525
Feb. 3, 2015 (JP) ........................... 2015-019526

Signed and Sealed this
Third Day of November, 2020

Andrei Iancu
*Director of the United States Patent and Trademark Office*